United States Patent [19]

Kelderman

[11] Patent Number: 4,503,660
[45] Date of Patent: Mar. 12, 1985

[54] WHEAT SWATHER

[76] Inventor: Gary L. Kelderman, R.R. 1, Oskaloosa, Iowa 52577

[21] Appl. No.: 560,161

[22] Filed: Dec. 12, 1983

[51] Int. Cl.³ .............................. A01D 43/12
[52] U.S. Cl. .................... 56/11.2; 56/14.5; 56/192; 56/DIG. 2
[58] Field of Search .............. 56/192, 14.2, 14.3, 56/14.4, 14.5, 16.9, 181, 121.42, 11.2, DIG. 2

[56] References Cited

U.S. PATENT DOCUMENTS

| 1,816,519 | 7/1931 | Ewing et al. | 56/192 |
| 3,241,300 | 3/1966 | Fell et al. | |
| 3,945,176 | 3/1976 | Vicendese et al. | 56/16.9 |
| 4,166,351 | 9/1979 | Nienberg. | |
| 4,182,098 | 1/1980 | Kass. | |
| 4,236,581 | 12/1980 | Beckett | 56/121.42 |

FOREIGN PATENT DOCUMENTS

| 518466 | 3/1955 | Italy | 56/192 |
| 843828 | 7/1981 | U.S.S.R. | 56/192 |

Primary Examiner—Jay N. Eskovitz
Attorney, Agent, or Firm—Henderson & Sturm

[57] ABSTRACT

A method and apparatus for cutting a swath of a first crop and then forming a windrow of such first crop to one side of such swath, whereby the ground thereunder can be planted to a second crop while the first crop is curing in the windrow. A mower with a single reversible conveyor belt for windrowing a first crop is attached to a prime mover, and a minimum tillage-type planting apparatus is attached behind such prime mover.

6 Claims, 4 Drawing Figures

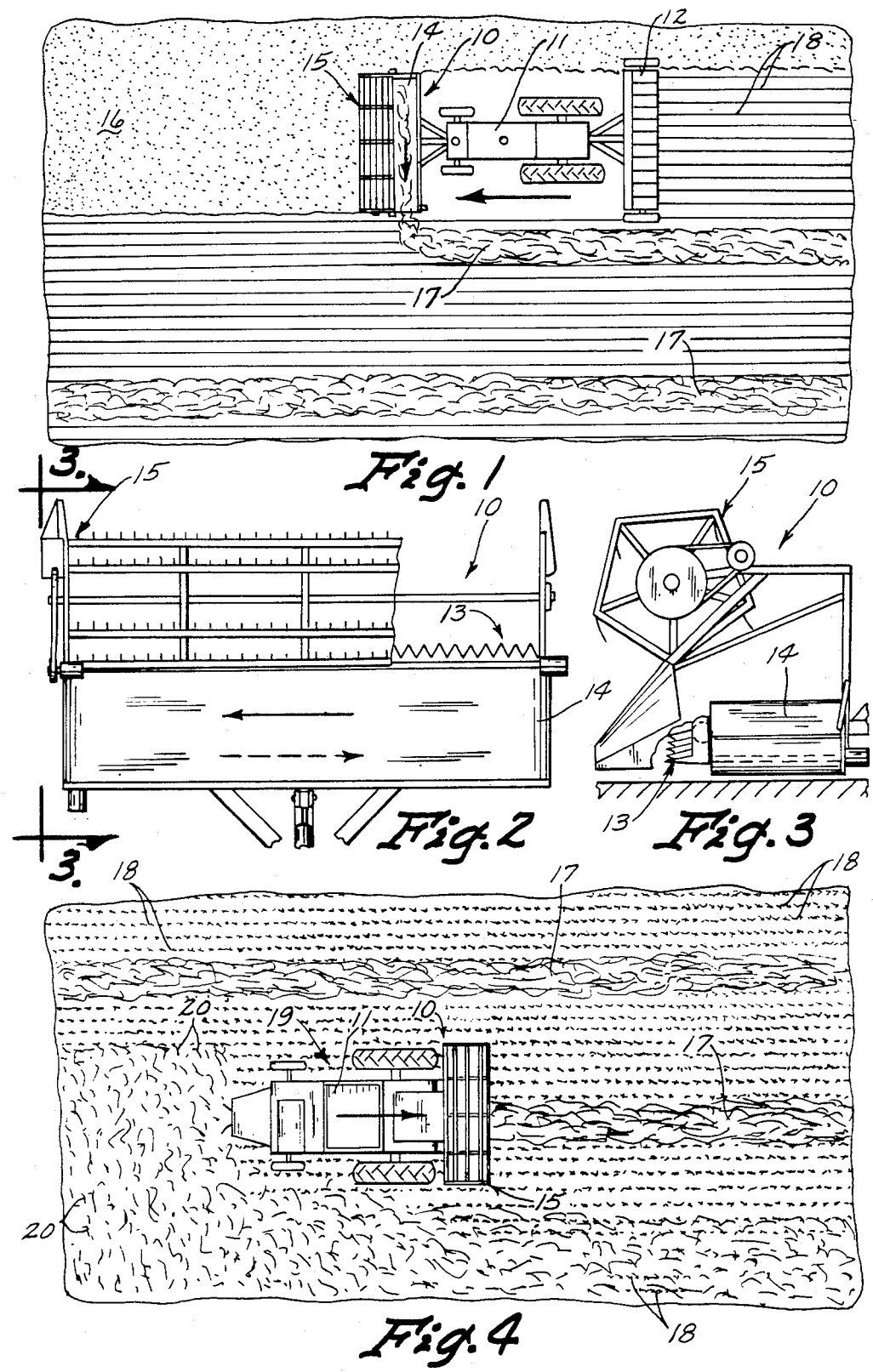

WHEAT SWATHER

TECHNICAL FIELD

The present invention relates generally to a method and apparatus for permitting more than one crop to grow in a single growing season for the same land, and more particularly to such a method and apparatus which permits the first crop to be cut and windrowed for drying and the second crop planted at the same time.

BACKGROUND ART

In the southern part of the United States, it is common to plant a crop like wheat which is harvested in the early part of the summer and then to plant a second crop on the same ground after such wheat has been harvested. This can be done where the growing season is long enough. The farther north, the shorter the growing season. So there has been developed an east-west line across the United States to define a general boundary south of which such double cropping can be done, and north of which the growing season is too short for double cropping of the same ground. Obviously, the same problems exist in other parts of the world.

Normally, wheat is harvested using a combine which cuts the plant off, removes the kernels of wheat and then discharges the chaff out of the back of the combine onto the ground. Sometimes, if the wheat field was not planted all at one time, or germinates at different times, for example because of varying moisture conditions, it would not be cured uniformly across the field at harvest time. So instead of using the combine only, the wheat is first cut and windrowed. For example, by a machine of the type shown in FIG. 13 of U.S. Pat. No. 4,166,351, wherein a first crop such as wheat is cut and then delivered by conveyor belts to a central rearwardly extending conveyor belt which would windrow the wheat plants onto the ground for curing. Then after these wheat plants are cured, the wheat would all be of substantially the same moisture content and the windrow would be picked up and processed by a combine, thereby separating the wheat from the chaff, of course leaving the chaff or tailings on the ground.

If it is then later desired to plant the ground to a second crop, then usually a no-till planter would be used later to plant the second crop. Sometimes the chaff or straw would be removed first so it does not interfere with the planting of the second crop, and sometimes it would not be removed. In any event, it was heretofore necessary to use a combine to separate the grain from the rest of the plant before the second crop is planted, otherwise the first crop would be destroyed in the process of planting the second one.

Another problem with double cropping is that the discarged portions of the plant, such as the wheat straw, interfere with the planting of the second crop and therefore it is often necessary to remove the straw before planting the second crop.

DISCLOSURE OF THE INVENTION

The present invention relates to a method and apparatus for cutting a swath of a first crop and then forming a windrow of such first crop to one side of such swath, whereby the ground thereunder can be planted to a second crop while the first crop is curing in the windrow. Typically, the apparatus used for this operation would be a sickle bar mower with a single reversible conveyor belt disposed therebehind, a prime mover attached behind such apparatus, and a minimum tillage-type planting apparatus disposed behind such prime mover.

Consequently, when this apparatus reaches the end of the field, a swath directly adjacent to one just taken can be made and the direction of the conveyor belt reversed during such second swath so as to deposit the windrow on the ground which was just planted to the second crop and further so that it does not interfere with the planting which occurs directly behind the cutter, windrower and prime mover.

An object of the present invention is to provide an improved apparatus for permitting double cropping of land in a single growing season.

Another object of the invention is to effectively move the geographic double cropping line north (in the northern hemisphere) by approximately 150 miles, whereby the geographic area for growing two crops in a single growing season is significantly enlarged.

Another object of the invention is to provide a cutting and windrowing apparatus which permits a minimum tillage planter to be used immediately therebehind the cutter windrower whereby the windrow formed does not interfere with the planting operation.

A still further object of the present invention is to permit the aforementioned cutting, windrowing and planting operation while not ruining the first crop which is being windrowed at a time before the grain is separated from the plant.

Other objects, advantages, and novel features of the present invention will become apparent from the following detailed description of the invention when considered in conjunction with the accompanying drawings.

BRIEF DESCRIPTION OF THE DRAWINGS

FIG. 1 is a top plan view illustrating the method and apparatus of the present invention;

FIG. 2 is an enlarged top plan view of the cutting and windrowing parts of the preferred embodiment of the present invention;

FIG. 3 is a side elevational view of the apparatus shown in FIG. 2 taken along line 3—3 of FIG. 2; and FIG. 4 is a top plan view showing a combine harvesting the windrows of the first crop at the same time that the second crop is growing.

BEST MODE FOR CARRYING OUT THE INVENTION

Referring now to the drawings wherein like reference numerals designate identical or corresponding parts throughout the several views, FIG. 1 shows the present apparatus (10) connected to the front of an agricultural tractor (11) which has a drill or planter (12) attached to the rear thereof. Referring to FIG. 2, it can be seen that a sickle bar mower (13) is disposed just ahead of a single conveyor belt (14). A conventional reel structure (15) is disposed above and forwardly of the sickle bar cutter (13) for moving the first crop which is cut by sickle bar mower (13) onto the conveyor belt (14).

In operation, the tractor (11) as shown in FIG. 1 having the invention (10) attached to the front thereof and a planting apparatus (12) attached to the rear thereof would be moved through the fields to cut the crop (16), and the conveyor (14) would be moving in the direction shown in the arrow in FIG. 1 so as to form a windrow (17) of the first crop (16). At the same time that this cutting and windrowing is occurring, a planting apparatus (12) is utilized to plant rows (18) of a second crop. Once the apparatus shown in FIG. 1 reaches the end of the field, then the apparatus would be turned so as to go back in the opposite direction from the direction shown in FIG. 1 to harvest the crop (16) in a swath which is directly adjacent to the swath being taken in as shown in FIG. 1. When the apparatus shown in FIG. 1 changes from the direction shown in FIG. 1 to the opposite direction just mentioned, then the direction of the reversible conveyor belt (14) must also be reversed to go in the direction shown in dashed lines if FIG. 2, whereby the windrow being formed will be formed on the ground which has just been planted in a previous trip across the field. Consequently, during this process the windrow will always be formed on soil which had just previously been planted and in this way the windrow will not interefere with the planting process.

Then after a period of time, for example a couple of weeks, after the grain or other crop in the windrow (17) has sufficiently matured, the combine (19) shown in FIG. 4 is utilized to pick up the windrow (17) at the same time that the second crop (18) is growing, and discharge and scatter the tailings or chaff (20) out the back of the combine (19), as is customary. It has been determined that the combine passing over the second crop (18) before such crops are very large has vey little effect upon such second crop.

Accordingly, it will be readily appreciated that the present invention permits a longer growing season for a second crop and thereby permits double cropping in geographic areas previously believed to have too short of a growing period under prior art methods of double cropping. Obviously, many modifications and variations of the present invention are possible in light of the above teachings. It is therefore to be understood that, within the scope of the appended claims, the invention may be practiced otherwise than as specifically described.

I claim:

1. Apparatus for permitting a longer growing season for the second crop of two crops grown in the same year on the same ground comprising:
   means adapted to be operably attached to a front portion of a prime mover for cutting a first swath of crop standing in a field;
   windrowing means adapted to be operably attached to said prime mover for gathering the cut crop in said swath and forming a windrow of the cut crop to one side of and outside of said first swath, said windrowing means comprising reversible means for permitting said windrow to be formed on either side of the swath being formed by said cutting means whereby the windrow can be selectively formed on soil previously having crop cut therefrom rather than on standing crops; and
   means attached to a rear portion of said prime mover for planting a second crop in the soil underlying said first swath.

2. The apparatus of claim 1 wherein said windrowing means comprises a conveyor belt extending across and behind said cutting means.

3. The apparatus of claim 2 wherein said conveyor means includes a single one piece endless belt.

4. The apparatus of claim 1 wherein sad cutting means comprises a sickle bar type cutter.

5. Method for permitting a longer growing season for the second crop of two crops grown in the same year on the same ground by utilizing an apparatus comprising: means adapted to be operably attached to a front portion of a prime mover for cutting a first swath of crop standing in a field; windrowing means adapted to be operably attached to said prime mover for gathering the cut crop in said swath and forming a windrow of the cut crop to one side of and outside of said first swath, said windrowing means comprising reversible means for permitting said windrow to be formed on either side of the swath being formed by said cutting means whereby the windrow can be selectively formed on soil previously having crop cut therefrom rather than on standing crops; and means attached to a rear portion of said prime mover for planting a second crop in the soil underlying said first swath, said method comprising:
   moving said prime mover forwardly across a field of growing crop; cutting a first swath while operating said windrow means to move said cut crop to a side opposite a second swath and outside of said first swath; simultaneously planting a second crop in the soil underlying said first swath; and immediately thereafter operating said cutting means and planting means simultaneously while simultaneously moving said prime mover forwardly across said second swath while also simultaneously operating said windrowing means to move second swath cut crop toward said first swath and deposit said second swath cut crop on the field on the outside of said second swath.

6. The method of claim 5 including a later step of allowing the first crop in said windrows to cure while the second crop in the ground thereunder is growing and picking up and removing said first crop after it is cured and while said second crop is growing.

* * * * *